(12) United States Patent
Lee et al.

(10) Patent No.: US 10,978,049 B2
(45) Date of Patent: Apr. 13, 2021

(54) AUDIO SEGMENTATION METHOD BASED ON ATTENTION MECHANISM

(71) Applicant: Korea Electronics Technology Institute, Seongnam-si (KR)

(72) Inventors: Young Han Lee, Yongin-si (KR); Jong Yeol Yang, Yongin-si (KR); Choong Sang Cho, Seongnam-si (KR); Hye Dong Jung, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 92 days.

(21) Appl. No.: 16/256,563

(22) Filed: Jan. 24, 2019

(65) Prior Publication Data
US 2020/0043473 A1    Feb. 6, 2020

(30) Foreign Application Priority Data

Jul. 31, 2018  (KR) .......................... 10-2018-0089545

(51) Int. Cl.
*G10L 15/16*    (2006.01)
*G10L 13/00*    (2006.01)
(Continued)

(52) U.S. Cl.
CPC .......... *G10L 15/148* (2013.01); *G06F 40/216* (2020.01); *G06N 7/005* (2013.01);
(Continued)

(58) Field of Classification Search
CPC ......... G10L 13/08; G10L 13/06; G10L 13/00; G10L 13/10; G10L 21/003; G10L 13/033; G10L 13/047; G10L 15/04; G10L 2015/025; G10L 13/04; G10L 13/07; G10L 21/06; G10L 21/10
See application file for complete search history.

(56) References Cited

U.S. PATENT DOCUMENTS 6,539,354 B1 * 3/2003 Sutton ..................... G10L 21/06
                                                       345/423
9,131,545 B2 * 9/2015 Verfuerth ............. H05B 47/105
(Continued)

FOREIGN PATENT DOCUMENTS

KR        10-1674851 B1   11/2016
KR    10-2017-0107683 A    9/2017

OTHER PUBLICATIONS

Korean Office Action dated Jan. 29, 2020 in corresponding Korean Patent Application No. 10-2018-0089545 (5 pages in English, 6 pages in Korean).

*Primary Examiner* — Olujimi A Adesanya
(74) *Attorney, Agent, or Firm* — NSIP Law

(57) ABSTRACT

An audio segmentation method based on an attention mechanism is provided. The audio segmentation method according to an embodiment obtains a mapping relationship between an "inputted text" and an "audio spectrum feature vector for generating an audio signal", the audio spectrum feature vector being automatically synthesized by using the inputted text, and segments an inputted audio signal by using the mapping relationship. Accordingly, high quality can be guaranteed and the effort, time, and cost can be noticeably reduced through audio segmentation utilizing the attention mechanism.

15 Claims, 6 Drawing Sheets

(51) Int. Cl.
*G10L 15/14* (2006.01)
*G10L 15/04* (2013.01)
*G06N 20/10* (2019.01)
*G06N 7/00* (2006.01)
*G10L 13/08* (2013.01)
*G06F 40/216* (2020.01)

(52) U.S. Cl.
CPC .............. *G06N 20/10* (2019.01); *G10L 13/08* (2013.01); *G10L 15/04* (2013.01); *G10L 15/144* (2013.01)

(56) References Cited

U.S. PATENT DOCUMENTS

| | | | |
|---|---|---|---|
| 9,305,530 B1* | 4/2016 | Durham | G10H 1/0008 |
| 9,959,368 B2* | 5/2018 | Kolluru | G06F 16/90335 |
| 10,127,904 B2* | 11/2018 | Rao | G06N 3/084 |
| 2002/0156626 A1* | 10/2002 | Hutchison | G10L 15/16 704/231 |
| 2012/0053933 A1* | 3/2012 | Tamura | G10L 13/04 704/207 |
| 2012/0130717 A1* | 5/2012 | Xu | H04L 51/10 704/258 |
| 2012/0310642 A1* | 12/2012 | Cao | G10L 15/26 704/235 |
| 2013/0124206 A1* | 5/2013 | Rezvani | G10L 13/08 704/270 |
| 2013/0262096 A1* | 10/2013 | Wilhelms-Tricarico | G10L 13/04 704/202 |
| 2014/0025382 A1* | 1/2014 | Chen | G10L 13/10 704/260 |
| 2015/0042662 A1* | 2/2015 | Latorre-Martinez | G06T 13/205 345/473 |
| 2019/0221202 A1* | 7/2019 | Li | G06F 17/16 |
| 2019/0355347 A1* | 11/2019 | Arik | G06N 20/20 |

* cited by examiner

ABSTRACT

AUDIO SEGMENTATION METHOD BASED ON ATTENTION MECHANISM

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Jul. 31, 2018, and assigned Serial No. 10-2018-0089545, the entire disclosure of which is hereby incorporated by reference.

TECHNICAL FIELD OF THE INVENTION

The present disclosure relates generally to an audio segmentation method, and more particularly, to a method for segmenting an audio automatically by using artificial intelligence (AI) technology.

BACKGROUND OF THE INVENTION

To segment an audio, an operation of classifying audio data is required. This operation may be performed manually or may be performed by utilizing unsupervised learning.

However, the audio segmentation by a manual operation requires an expert to mark a point of time for classifying audio data, while directly listening to audio data. Therefore, there is a problem that the effort, time and cost required to perform the manual operation increase.

In addition, the audio segmentation by unsupervised learning may cause a segmentation error to frequently occur and may degrade a quality of a final product.

Accordingly, there is a need for an audio segmentation method which can reduce the effort, time, and cost while guaranteeing quality.

SUMMARY OF THE INVENTION

To address the above-discussed deficiencies of the prior art, it is a primary object of the present disclosure to provide an audio segmentation method utilizing an attention mechanism, which can reduce the effort, time, and cost while guaranteeing quality.

According to one aspect of the present disclosure to achieve the above-described objects, an audio segmentation method includes: receiving an input of an audio signal; receiving an input of a text regarding the audio signal; obtaining a mapping relationship between the "inputted text" and an "audio spectrum feature vector for generating an audio signal regarding the text", the audio spectrum feature vector being automatically synthesized by using the inputted text; and segmenting the inputted audio signal by using the mapping relationship.

In addition, the obtaining may include obtaining the mapping relationship from an AI module which learns the mapping relationship between the "inputted text" and the "audio spectrum feature vector", in an AI mechanism which automatically synthesizes an audio spectrum feature vector for generating an audio signal regarding a text using an inputted text.

In addition, the mapping relationship may be a map indicating degrees of mapping between respective "labels forming the inputted text" and respective "audio spectrum features forming the audio spectrum feature vector."

In addition, the audio segmentation method according to an embodiment may further include post-processing the obtained mapping relationship, and the segmenting may include segmenting the inputted audio signal by using the post-processed mapping relationship.

In addition, the post-processing may include mapping the respective "audio spectrum features" onto one of the "labels forming the inputted text" based on the degrees of mapping.

In addition, the post-processing may include using any one of a maximum degree of mapping, and a weight matrix and a function for mapping the respective audio spectrum features onto one of the labels forming the inputted text.

In addition, the post-processing may include integrating audio spectrum features of labels corresponding to a prolonged sound.

In addition, the segmenting may include: a first segmentation step of segmenting an audio signal synthesized by using the audio spectrum feature vector with reference to the mapping relationship; and a second segmentation step of segmenting the inputted audio signal with reference to a result of the segmenting at the first segmentation step.

In addition, the second segmentation step may include performing a convolution operation with respect to the synthesized audio signal and the inputted audio signal, searching sections of the inputted audio signal that are equal to segmentation sections of the synthesized audio signal, and classifying the inputted audio signal into a plurality of sections.

According to another aspect of the present disclosure, an audio segmentation system includes: an input unit configured to receive input of an audio signal and a text regarding the audio signal; and a processor configured to obtain a mapping relationship between the "inputted text" and an "audio spectrum feature vector for generating an audio signal regarding the text", the audio spectrum feature vector being automatically synthesized by using the inputted text, and to segment the inputted audio signal by using the mapping relationship.

According to still another aspect of the present disclosure, an audio segmentation method includes: obtaining a mapping relationship between an "inputted text" and an "audio spectrum feature vector for generating an audio signal regarding the text", the audio spectrum feature vector being automatically synthesized by using the inputted text; segmenting an inputted audio signal by using the mapping relationship; and outputting a result of segmenting the inputted audio signal.

According to yet another aspect of the present disclosure, an audio segmentation system includes: a processor configured to obtain a mapping relationship between an "inputted text" and an "audio spectrum feature vector for generating an audio signal regarding the text", the audio spectrum feature vector being automatically synthesized by using the inputted text, and to segmenting an inputted audio signal by using the mapping relationship; and an output unit configured to output a result of segmenting the inputted audio signal.

According to embodiments of the present disclosure described above, high quality can be guaranteed and the effort, time, and cost can be noticeably reduced through audio segmentation utilizing the attention mechanism.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise", as well as derivatives thereof, mean inclusion without limitation; the term "or", is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Hereinafter, the present disclosure will be described in detail with reference to the accompanying drawings.

Figure 1:
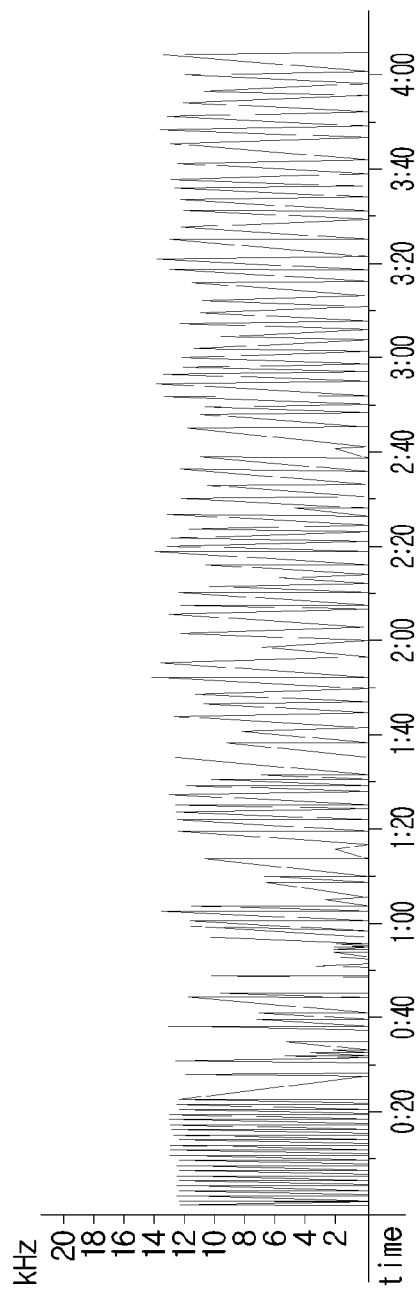
FIG. 1 is a view illustrating a screen used to perform audio segmentation by a manual operation.

FIG. 1 is a view illustrating a screen used to perform audio segmentation by a manual operation. The audio segmentation by a manual operation refers to a method in which an expert directly listens to an audio and segments the audio by directly classifying the audio according to text labels as shown in FIG. 1.

However, since there are great variations in the segmentation performance/quality according to the ability and policy of an expert, and the time and cost increase in proportion to the size of a database, there may be a burden, in particular, to segmenting high-capacity audio data.

Figure 2:
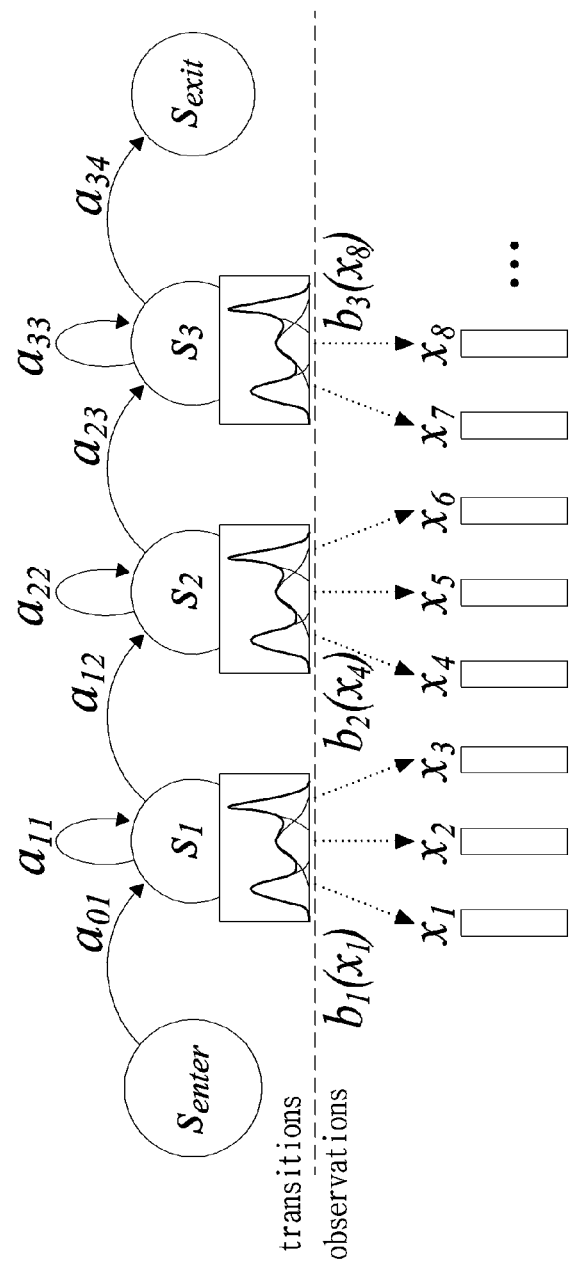
FIG. 2 is a view illustrating an audio segmentation technique using a GMM-HMM-based learning machine.

FIG. 2 is a view illustrating an audio segmentation technique using a GMM-HMM-based learning machine. In the case of the audio segmentation based on GMM-HMM-based learning, the time required to perform machine learning may increase according to the size of a database, but a manual operation is not required, and thus there are advantages in terms of time and cost. However, there may be a great segmentation error, and accordingly, it may be inappropriate to use audio data segmented in this method.

Figure 3:
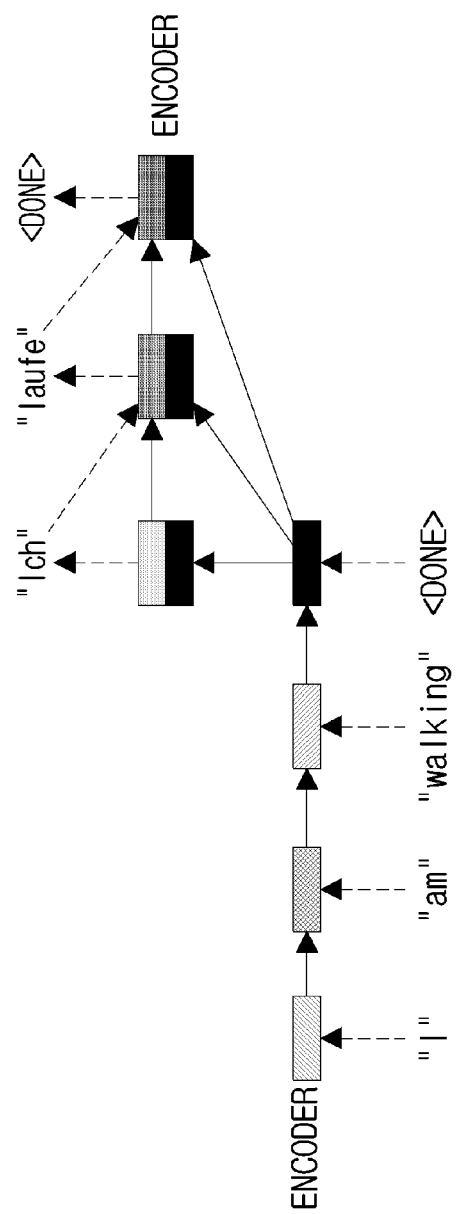
FIG. 3 is a view illustrating a structure of a seq-to-seq model configured in the form of encoder-decoder.

FIG. 3 is a view illustrating a structure of a seq(uence)-to-seq(uence) model configured in the form of encoder-decoder. An attention mechanism to be utilized in an audio segmentation method according to embodiments of the present disclosure is based on the seq-to-seq model which is one of the deep learning technologies.

As shown in FIG. 3, the seq-to-seq model is deep learning technology to be applied to an application field which receives an input of time-series data, and outputs time-series data.

The audio segmentation method according to an embodiment of the present disclosure utilizes the attention mechanism to receive an input of audio data which is one of the time series data, and to generate continuous segmentation data corresponding to the audio data.

Figure 4:
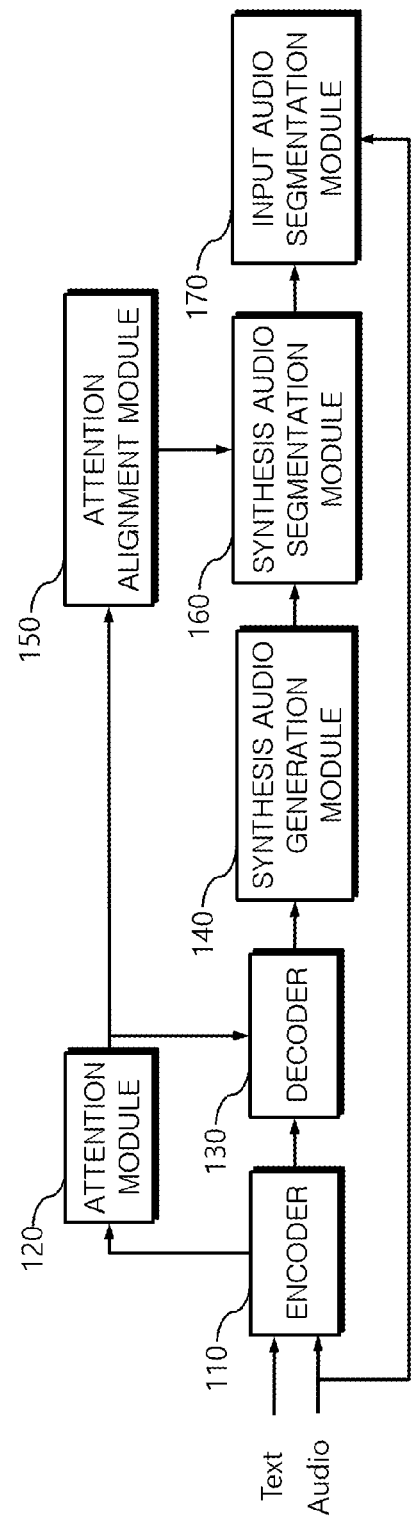
FIG. 4 is a view provided to explain an audio segmentation method based on an attention mechanism according to an embodiment of the present disclosure.

Hereinafter, an audio segmentation method according to an embodiment of the present disclosure will be described in detail with reference to FIG. 4. FIG. 4 is a view provided to explain the audio segmentation method based on the attention mechanism according to an embodiment.

The audio segmentation method according to an embodiment segments an audio with a high operation efficiency, while reducing a segmentation error by using the attention mechanism used for an end-to-end speech synthesis technique.

To achieve this, the audio segmentation method according to an embodiment segments an audio synthesized from a text according to text labels by utilizing attention information, and segments an input audio by referring to the segmented synthesis audio. A detailed process of segmenting an input audio will be described hereinbelow.

As shown in FIG. 4, an audio signal and a text regarding the audio signal are received, first. Then, an encoder 110 extracts a feature vector regarding the inputted text.

A decoder 130 automatically generates an audio spectrum feature vector regarding the input text by using the feature vector extracted by the encoder 110. An audio signal regarding the text may be synthesized from the audio spectrum feature vector.

An attention module 120 generates a mapping relationship between the text inputted to the encoder 110 and the audio spectrum feature vector generated at the decoder 130. The mapping relationship generated by the attention module 120 indicates a degree of mapping between respective "labels forming the input text" and respective "audio spectrum features forming the audio spectrum feature vector."

As described above, the attention module 120 corresponds to an AI module which learns a correlation between the "input text" and the "audio spectrum feature vector" in an AI mechanism, which automatically synthesizes an audio spectrum feature vector for generating an audio signal regarding a text by using an input text.

In generating the audio spectrum feature vector regarding the input text, the decoder 130 refers to the mapping relationship generated by the attention module 120. This reference is to appropriately distribute the text labels to the audio signal.

A synthesis audio generation module 140 synthesizes an audio signal regarding the input text from the audio spectrum feature vector generated by the decoder 130.

An attention alignment module 150 is a module for post-processing the mapping relationship generated by the attention module 120, and maps the respective "audio spectrum features" onto only one optimal label from among the "labels forming the inputted text", based on the degree of mapping appearing in the mapping relationship.

Specifically, the attention alignment module 150 may map the audio spectrum features onto a text label having the greatest degree of mapping. In another method, the attention alignment module 150 may use a weight matrix, a function, or the like to map the audio spectrum features and the label, and the weight matrix, the function, or the like may be trained through learning.

In addition, the attention alignment module 150 may integrate audio spectrum features of text labels corresponding to a prolonged sound.

A synthesis audio segmentation module 160 may segment the synthesis audio signal generated at the synthesis audio generation module 140 by using the mapping relationship post-processed by the attention alignment module 150.

An input audio segmentation module 170 may segment the input audio signal by referring to the synthesis audio signal segmented by the synthesis audio segmentation module 160.

Specifically, the input audio segmentation module 170 performs a convolution operation with respect to the synthesis audio signal and the input audio signal, searches sections of the input audio signal which are equal to segmentation sections of the synthesis audio signal, and classifies the input audio signal into a plurality of sections.

Figure 5:
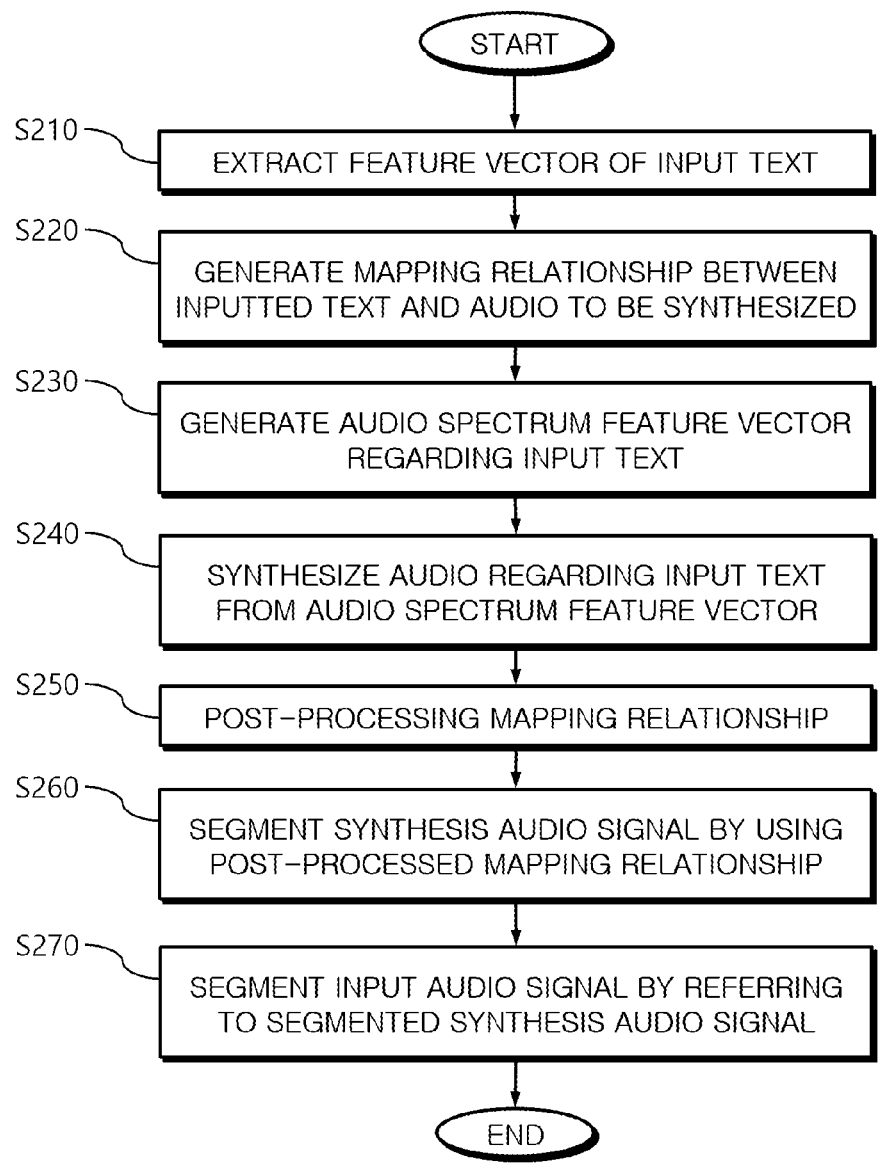
FIG. 5 is a flowchart provided to explain an audio segmentation method according to another embodiment of the present disclosure.

FIG. 5 is a flowchart provided to explain an audio segmentation method according to another embodiment. To segment an input audio, a text regarding the input audio is required in addition to the input audio.

As shown in FIG. 5, the encoder 110 extracts a feature vector regarding the input text (S210). In addition, the attention module 120 generates a mapping relationship between the input text and an audio spectrum feature vector for generating a synthesis audio (S220).

The decoder 130 generates an audio spectrum feature vector regarding the input text by using the feature vector extracted at step S210 with reference to the mapping relationship generated at step S220 (S230).

The synthesis audio generation module 140 synthesizes an audio signal regarding the input text from the audio spectrum feature vector generated at step S230 (S240).

The attention alignment module 150 post-processes the mapping relationship generated at step S230, and maps respective "audio spectrum features" onto only one optimal label from among "labels forming the inputted text" (S250). Furthermore, the attention alignment module 150 may integrate audio spectrum features of labels corresponding to a prolonged sound.

Then, the synthesis audio segmentation module 160 may segment the synthesis audio signal generated at step S240 by using the mapping relationship post-processed at step S250 (S260).

The input audio segmentation module 170 segments the input audio signal by referring to the synthesis audio signal segmented at step S260 (S270).

Figure 6:
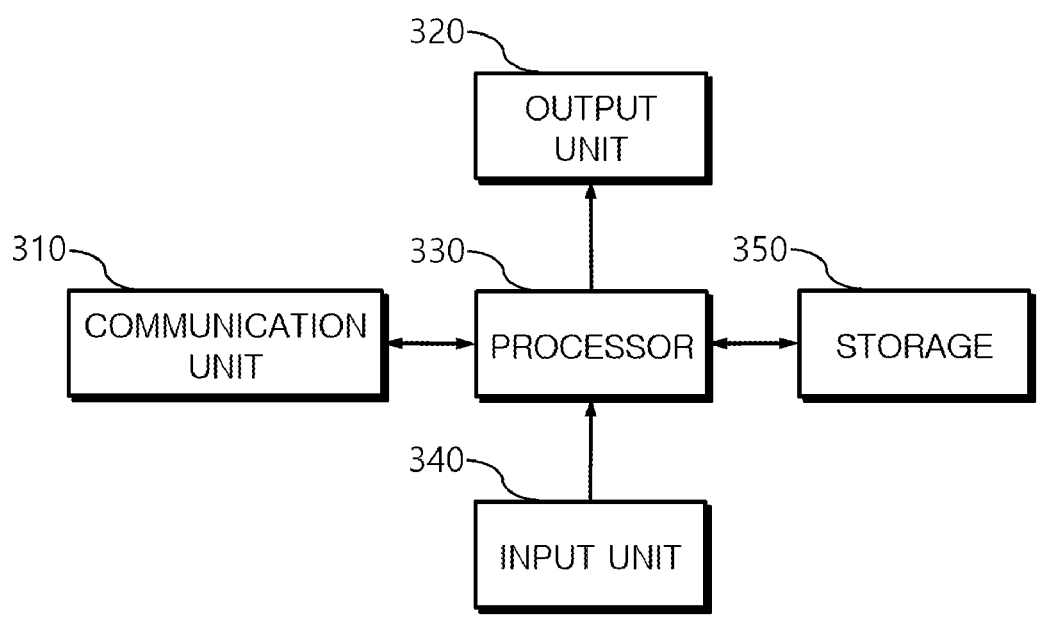
FIG. 6 is a block diagram illustrating a hardware configuration of an audio segmentation system according to still another embodiment of the present disclosure.

FIG. 6 is a block diagram illustrating a hardware configuration of an audio segmentation system according to still another embodiment. The audio segmentation system according to still another embodiment may be implemented by using a computing system including a communication unit 310, an output unit 320, a processor 330, an input unit 340, and a storage 350 as shown in FIG. 6.

The communication unit 310 is a communicating means for receiving input of an audio and a text regarding the audio from an external device and an external network.

The input unit 340 is an input means for receiving an input of a user setting command, and the output unit 320 is a display for outputting an audio segmentation process and an audio segmentation result.

The processor 330 may segment an audio by executing the methods illustrated in FIGS. 3 and 4.

The storage 350 provides a storage space necessary for the operations of the processor 330. In addition, the storage 350 may store texts and audios.

Up to now, the audio segmentation method and system based on the attention mechanism have been described with reference to preferred embodiments.

Embodiments of the present disclosure suggest a technique that can noticeably reduce the effort, time, and cost while guaranteeing high quality, through audio segmentation utilizing the attention mechanism.

The audio segmentation mentioned in the above-described embodiments is merely an example for convenience of explanation, and the technical idea of the present disclosure can be applied to a case where other time series data are segmented in addition to an audio such as speech.

The technical idea of the present disclosure may be applied to a computer-readable recording medium which records a computer program for performing functions of the apparatus and method according to the present embodiments. In addition, the technical idea according to various embodiments of the present disclosure may be implemented in the form of a computer-readable code recorded on a computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An audio segmentation method comprising:
    receiving an input of an audio signal;
    receiving an input of a text regarding the audio signal;
    performing, using a trained Artificial Intelligence (AI) module, an attention mechanism to determine a mapping relationship between the inputted text and an audio spectrum feature vector for generating an audio signal regarding the inputted text, the audio spectrum feature vector being automatically synthesized by using the inputted text, and the trained AI module being configured to generate the mapping relationship as an output; and
    segmenting the inputted audio signal by using the mapping relationship generated from the trained AI module,
    wherein the segmenting comprises:
    a first segmentation step of segmenting an audio signal synthesized by using the audio spectrum feature vector with reference to the mapping relationship; and
    a second segmentation step of segmenting the inputted audio signal with reference to a result of the segmenting at the first segmentation step, and
    wherein the second segmentation step comprises performing a convolution operation with respect to the synthesized audio signal and the inputted audio signal, searching sections of the inputted audio signal that are equal to segmentation sections of the synthesized audio signal, and classifying the inputted audio signal into a plurality of sections.

2. The method of claim 1, wherein the trained AI module learns and generates the mapping relationship between the inputted text and the audio spectrum feature vector, in an AI mechanism which automatically synthesizes an audio spectrum feature vector for generating an audio signal regarding a text using an inputted text.

3. The method of claim 2, wherein the mapping relationship is a map indicating degrees of mapping between respective labels forming the inputted text and respective audio spectrum features forming the audio spectrum feature vector.

4. The method of claim 1, further comprising post-processing the determined mapping relationship generated from the trained AI module,
wherein the segmenting comprises segmenting the inputted audio signal by using the post-processed mapping relationship.

5. The method of claim 4, wherein the post-processing comprises mapping the respective audio spectrum features onto one of the labels forming the inputted text based on degrees of mapping.

6. The method of claim 5, wherein the post-processing comprises using any one of a maximum degree of mapping, and a weight matrix and a function for mapping the respective audio spectrum features onto one of the labels forming the inputted text.

7. The method of claim 5, wherein the post-processing comprises integrating audio spectrum features of labels corresponding to a prolonged sound.

8. An audio segmentation system comprising:
an input unit configured to receive inputs of an audio signal and a text regarding the audio signal; and
a processor configured to:
perform, using a trained Artificial Intelligence (AI) module, an attention mechanism to determine a mapping relationship between the inputted text and an audio spectrum feature vector for generating an audio signal regarding the inputted text, the audio spectrum feature vector being automatically synthesized by using the inputted text, and the trained AI module being configured to generate the mapping relationship as an output; and
segment the inputted audio signal by using the mapping relationship generated from the trained AI module,
wherein, for the segmenting, the processor is further configured to:
perform a first segmentation step of segmenting an audio signal synthesized by using the audio spectrum feature vector with reference to the mapping relationship; and
perform a second segmentation step of segmenting the inputted audio signal with reference to a result of the segmenting at the first segmentation step, and
wherein, for the second segmentation step, the processor is further configured to perform a convolution operation with respect to the synthesized audio signal and the inputted audio signal, search sections of the inputted audio signal that are equal to segmentation sections of the synthesized audio signal, and classify the inputted audio signal into a plurality of sections.

9. The system of claim 8, wherein the trained AI module learns and generates the mapping relationship between the inputted text and the audio spectrum feature vector, in an AI mechanism which automatically synthesizes an audio spectrum feature vector for generating an audio signal regarding a text using an inputted text.

10. The system of claim 9, wherein the mapping relationship is a map indicating degrees of mapping between respective labels forming the inputted text and respective audio spectrum features forming the audio spectrum feature vector.

11. The system of claim 8, wherein the processor is further configured to:
perform a post-processing the determined mapping relationship generated from the trained AI module; and
segment the inputted audio signal by using the post-processed mapping relationship.

12. The system of claim 11, wherein, for the post-processing, the processor is further configured to map the respective audio spectrum features onto one of the labels forming the inputted text based on degrees of mapping.

13. The system of claim 12, wherein, for the post-processing, the processor is further configured to use any one of a maximum degree of mapping, and a weight matrix and a function for mapping the respective audio spectrum features onto one of the labels forming the inputted text.

14. The system of claim 12, wherein, for the post-processing, the processor is further configured to integrate audio spectrum features of labels corresponding to a prolonged sound.

15. An audio segmentation method comprising:
performing, using a trained Artificial Intelligence (AI) module, an attention mechanism to determine a mapping relationship between an inputted text and an audio spectrum feature vector for generating an audio signal regarding the inputted text, the audio spectrum feature vector being automatically synthesized by using the inputted text, and the trained AI module being configured to generate the mapping relationship as an output;
segmenting an inputted audio signal by using the mapping relationship generated from the trained AI module; and
outputting a result of segmenting the inputted audio signal,
wherein the segmenting comprises:
a first segmentation step of segmenting an audio signal synthesized by using the audio spectrum feature vector with reference to the mapping relationship; and
a second segmentation step of segmenting the inputted audio signal with reference to a result of the segmenting at the first segmentation step, and
wherein the second segmentation step comprises performing a convolution operation with respect to the synthesized audio signal and the inputted audio signal, searching sections of the inputted audio signal that are equal to segmentation sections of the synthesized audio signal, and classifying the inputted audio signal into a plurality of sections.

\* \* \* \* \*